(12) United States Patent
Ogura et al.

(10) Patent No.: US 7,220,444 B2
(45) Date of Patent: *May 22, 2007

(54) PACKAGED BEVERAGES

(75) Inventors: Yoshikazu Ogura, Tokyo (JP); Seiji Yamasaki, Tokyo (JP); Koichi Naitoh, Tokyo (JP)

(73) Assignee: Kao Corporation, Tokyo (JP)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 10/948,163

(22) Filed: Sep. 24, 2004

(65) Prior Publication Data

US 2005/0095340 A1    May 5, 2005

(30) Foreign Application Priority Data

Sep. 26, 2003  (JP) .............. 2003-334628
Oct. 29, 2003  (JP) .............. 2003-368266

(51) Int. Cl.
*A23F 3/00*    (2006.01)

(52) U.S. Cl. .............. 426/597; 426/106; 426/330.3; 426/324

(58) Field of Classification Search .......... 426/597, 426/106, 324, 330.3
See application file for complete search history.

(56) References Cited

U.S. PATENT DOCUMENTS

| | | | | |
|---|---|---|---|---|
| 5,264,348 A * | 11/1993 | Schick et al. | ............ | 435/28 |
| 5,681,569 A * | 10/1997 | Kuznicki et al. | ............ | 424/439 |
| 5,773,062 A * | 6/1998 | Cirigliano et al. | ............ | 426/330.3 |
| 6,299,925 B1 * | 10/2001 | Xiong et al. | ............ | 426/597 |
| 2003/0077374 A1 * | 4/2003 | Ohishi et al. | ............ | 426/597 |
| 2003/0096050 A1 * | 5/2003 | Inaoka et al. | ............ | 426/597 |

OTHER PUBLICATIONS

Notice of Opposition to the Grant of Patent: Filed Nov. 6, 2003 Notice of Opposition (Ito En, Ltd.): Opposition No. 2003-72696; Japanese Patent No. 3403400; Jun. 17, 2003.*

* cited by examiner

*Primary Examiner*—Anthony Weier
(74) *Attorney, Agent, or Firm*—Oblon, Spivak, McClelland, Maier & Neustadt, P.C.

(57) ABSTRACT

Packaged beverages contain the following ingredients: (A) from 0.07 to 0.45 wt. % of non-polymer catechins, (B) from 0.06 to 0.5 wt. % of ascorbic acid or a metal salt thereof, and (C) non-polymer catechingallates. A content weight ratio (C/A) of the non-polymer catechingallates (C) to the non-polymer catechins (A) is from 0.8 to 1.0, and the packaged beverages have a pH of from 4.5 to 7. Another type of packaged beverages contain the following ingredients: (A) from 0.05 to 0.45 wt. % of non-polymer catechins, and (D) from 0.07 to 0.49 wt. % of β-cyclodextrin. The non-polymer catechins (A) contain (C) non-polymer catechingallates at a weight ratio (C/A) of from 0.7 to 1.0 relative to the non-polymer catechins (A).

6 Claims, No Drawings

PACKAGED BEVERAGES

FIELD OF THE INVENTION

This invention relates to packaged beverages containing non-polymer catechingallates at high concentration, as well as to a process for their production.

BACKGROUND OF THE INVENTION

So far, catechins have been reported to have a suppressing effect on an increase in cholesterol level and an inhibitory effect on α-amylase activity (see, for example, JP-A-60-156614 and JP-A-03-133928). For such physiological effects to manifest, it is necessary for an adult to drink 4 to 5 cups of tea a day. Accordingly, there has been a demand for techniques enabling catechins to be contained catechins at high concentration in beverages to facilitate the ingestion of a large amount of catechins. As one of such techniques, catechins are added in a dissolved form to a beverage by using the concentrate of a tea extract (see, for example, JP-A-59-219384).

So-called non-polymer catechingallates such as gallocatechingallate and epigallocatechingallate are known to be particularly high in physiological activities, among such non-polymer catechins, and their use as antiallergic agents or cerebral function activators in the field of foods, beverages and health foods has been proposed (see, for example, JP-A-08-242813, and JP-A-11-18722). However, these non-polymer catechingallates are obtained through many purification processes, in which they are exposed to an acid, an alkali, heat, a solvent and the like, respectively, in the course of their production in which they are highly purified and formulated into preparations to enhance their physiological effects. As a result, these non-polymer catechingallates show a unique color tone while they are green tea extracts. Therefore, there has been a serious problem in that difficulties are encountered in making full use of these non-polymer catechingallates upon formulation of beverages despite their high physiological effects. For beverages containing such non-polymer catechingallates added at high concentration, the stability in their external appearance against pH variations during long-term storage or upon heat sterilization has thus become a particularly important goal to be achieved.

In addition, the unique color tone of such non-polymer catechingallates involves another problem in that, upon taking the beverages, the pigmentation of teeth tends to become readily recognizable.

SUMMARY OF THE INVENTION

In a first aspect of the present invention, there is thus provided a packaged beverage containing the following ingredients (A), (B) and (C):

(A) from 0.07 to 0.45 wt. % of non-polymer catechins,
(B) from 0.06 to 0.5 wt. % of ascorbic acid or a metal salt thereof, and
(C) non-polymer catechingallates, wherein a content weight ratio of the non-polymer catechingallates (C) to the non-polymer catechins (A), (i.e., (C/A)), is from 0.8 to 1.0, and the packaged beverage has a pH of from 4.5 to 7.

This invention also provides a method for controlling a hue change in a packaged beverage and a process for producing a packaged beverage controlled in a hue change, each of which contains:

providing a beverage containing (A) from 0.07 to 0.45 wt. % of non-polymer catechins wherein the non-polymer catechins (A) contain (C) non-polymer catechingallates at a content weight ratio (C/A) of from 0.8 to 1.0 relative to the non-polymer catechins (A), adding from 0.06 to 0.5 wt. % of ascorbic acid or a metal salt thereof to the beverage, and adjusting the pH of the resulting beverage to from 4.5 to 7.

In a second aspect of the present invention, there is also provided a packaged beverage containing the following ingredients (A) and (D):

(A) from 0.05 to 0.45 wt. % of non-polymer catechins, and
(D) from 0.07 to 0.49 wt. % of β-cyclodextrin, wherein the non-polymer catechins (A) contain (C) non-polymer catechingallates at a weight ratio (C/A) of from 0.7 to 1.0 relative to the non-polymer catechins (A).

This invention further provides a method for controlling pigmentation of teeth caused by a packaged beverage, which contains:

providing a beverage comprising (A) from 0.05 to 0.45 wt. % of non-polymer catechins wherein the non-polymer catechins (A) contain (C) non-polymer catechingallates at a weight ratio (C/A) of from 0.7 to 1.0 relative to the non-polymer catechins (A), and adding from 0.07 to 0.49 wt. % of β-cyclodextrin to the beverage.

DETAILED DESCRIPTION OF THE INVENTION

The present invention, in the first aspect thereof, provides a packaged beverage, which contains non-polymer catechingallates at high concentration and is controlled in a hue change.

The present inventors have made an investigation to control a hue change in a packaged beverage which contains non-polymer catechingallates at high concentration. As a result, it found that a packaged beverage, the hue of which hardly changes even under pH variations generally expected during long-term storage or upon heat sterilization, can be obtained by adding ascorbic acid or a metal salt thereof in a certain amount and adjusting the pH to from 4.5 to 7.

According to the present invention, a packaged beverage containing non-polymer catechingallates at high concentration, the external appearance of which is not affected by pH changes during long-term storage or upon heat sterilization, can be obtained. As the hue does not change even when stored over a long term, the beverage can be supplied as a packaged beverage filled in a clear PET bottle.

The present invention, in the second aspect thereof, also provides a packaged beverage, which contains non-polymer catechingallates at high concentration and controls the pigmentation of teeth upon drinking the same.

The present inventors have also made an investigation to control the pigmentation of teeth with a packaged beverage which contains non-polymer catechingallates at high concentration. As a result, it found that the addition of β-cyclodextrin in a certain amount makes it possible to control the pigmentation of teeth and to avoid any substantial impairment to the beauty of teeth even when taken over a long term.

According to the present invention, the addition of β-cyclodextrin in a certain amount to a high-gallates beverage makes it possible to obtain a packaged beverage, which can control the pigmentation of teeth with the characteristic hue of a green tea extract of extremely high purification degree and brings no damage to the external appearance teeth even during long-term storage.

A description will first be made about the first aspect of the present invention.

The term "non-polymer catechins (A)" as used herein is a generic term, which collectively encompasses non-epicatechins such as catechin, gallocatechin, catechingallate and gallocatechingallate, and epicatechins such as epicatechin, epigallocatechin, epicatechingallate, epigallocatechingallate.

The term "non-polymer catechingallates (C)" as used herein is a generic term, which collectively embraces four types of catechingallates, that is, catechingallate, gallocatechingallate, epicatechingallate, and epigallocatechingallate.

The packaged beverage according to the present invention contains the non-polymer catechins (A), each of which is a non-polymer and is in a form dissolved in water, at from 0.07 to 0.45 wt. %, preferably from 0.08 to 0.45 wt. %, more preferably from 0.09 to 0.45 wt. %, even more preferably from 0.1 to 0.36 wt. %, even more preferably from 0.11 to 0.3 wt. %, and even more preferably from 0.12 to 0.3 wt. %. A content of non-polymer catechins at lower than 0.07 wt. % makes it difficult to readily ingest a number of non-polymer catechins at once. A concentration higher than 0.45 wt. %, on the other hand, can hardly lessen the bitterness and astringency derived from non-polymer catechins.

The concentration of non-polymer catechins (A)" in the present invention is defined in terms of the total amount of eight types of catechins, that is, catechin, gallocatechin, catechingallate, gallocatechingallate, epicatechin, epigallocatechin, epicatechingallate and epigallocatechingallate. On the other hand, the concentration of non-polymer catechingallates (C) in the present invention is defined in terms of the total amount of four types of catechingallates, that is, catechingallate, gallocatechingallate, epicatechingallate, and epigallocatechingallate.

In the packaged beverage according to the present invention, the weight ratio [(C)/(A)] of the content of the non-polymer catechingallates (C), which consist of catechingallate, epicatechingallate, gallocatechingallate and epigallocatechingallate, to the content of the non-polymer catechins (A) is from 0.8 to 1.0, preferably from 0.85 to 1.0, more preferably from 0.9 to 1.0, and even more preferably from 0.95 to 1.0. No satisfactory physiological effects can be obtained if this ratio is smaller than 0.8.

In the non-polymer catechins in the packaged beverage according to the present invention, the weight ratio (A1/A2) of the non-epicatechins (A1) to the epicatechins (A2) may be preferably from 0.54 to 9.0, more preferably from 0.55 to 9.0, even more preferably from 0.67 to 9.0, and even more preferably from 1.0 to 9.0 from the standpoint of controlling a hue change during storage.

The present invention controls a hue change during long-term storage or upon heat sterilization by adding from 0.06 to 0.5 wt. % of ascorbic acid or a metal salt thereof (B) to a beverage with the non-polymer catechingallates contained at high concentration, and then adjusting the pH of the resulting beverage to from 4.5 to 7. Ascorbic acid has antiscorbutic activity, and is contained abundantly in fruit juice of Chinese citrons, lemons, paprikas or the like. As an illustrative commercial product of ascorbic acid for use in the present invention, ascorbic acid (product of Daiichi Pharmaceutical Co., Ltd.) can be mentioned.

Examples of the metal salt of ascorbic acid include sodium ascorbate and potassium ascorbate, with sodium ascorbate being preferred. Sodium ascorbate ($C_6H_7O_6Na$) is considered to act as ascorbic acid in vivo. As an illustrative commercial product of sodium ascorbate, sodium L-ascorbate (product of Daiichi Fine Chemical Co., Ltd.) or the like can be mentioned.

In the packaged beverage according to the present invention, ascorbic acid or a metal salt thereof (B) is contained at a range from 0.06 to 0.5 wt. %, preferably from 0.1 to 0.5 wt. %, more preferably from 0.15 to 0.5 wt. %. With a system added with no ascorbic acid or no metal salt thereof or with a system added with ascorbic acid or a salt thereof at lower than 0.06 wt. %, the beverage must be taken in a large amount to develop physiological effects. With ascorbic acid, a concentration higher than 0.5 wt. % is not preferred because a pungent acid taste excessively comes to the fore. With the metal salt of ascorbic acid, on the other hand, a concentration higher than 0.5 wt. % is not preferred either because a salty taste or the like excessively comes to the fore.

The pH of the packaged beverage according to the present invention is set at a range from 4.5 to 7, preferably from 4.5 to 6.5, and more preferably from 4.8 to 6.5 at 25° C. from the standpoint of the stability of the color tone of the beverage containing non-polymer catechingallates at high concentration. It is preferred to adjust the pH by controlling the amount of ascorbic acid or the metal salt thereof to be added.

It is preferred to add a bitterness suppressor to the packaged beverage according to the present invention, because it renders the packaged beverage more palatable. Preferred examples of the bitterness suppressor include water-soluble high-molecular substances and cyclodextrins. Illustrative of the water-soluble high-molecular substances are pectin and dextrin. Usable examples of the cyclodextrins include α-, β- and γ-cyclodextrins and branched α-, β- and γ-cyclodextrins.

To the packaged beverage according to the present invention, it is possible to add, in combination with the ingredients derived from tea, additives—such as antioxidants, flavors, various esters, organic acids, organic acid salts, inorganic acids, inorganic acid salts, inorganic salts, colorants, emulsifiers, preservatives, seasoning agents, pH regulators and quality stabilizers—either singly or in combination. As a pH regulator, sodium hydrogencarbonate or the like can be used.

Examples of the inorganic acids and inorganic acid salts include phosphoric acid, disodium phosphate, sodium metaphosphate, and sodium polyphosphate. These inorganic acids and inorganic acid salts may be contained preferably at a concentration of from 0.01 to 0.5 wt. %, with from 0.01 to 0.3 wt. % being more preferred, in the beverage according to the present invention.

The packaged beverage according to the present invention can be produced preferably by adding a concentrate of green tea to a tea extract. The term "tea extract" as used herein means a solution extracted with water, hot water, water-containing ethanol or the like from tea leaves by a usual means. Examples of the green tea for use in the extraction include tea leaves prepared from green tea leaves of the Genus Camellia, for example, *C. sinensis, C. assamica* and the Yabukita variety, or their hybrids. As the prepared tea leaves, so-called green tea leaves such as sencha (middle-grade green tea) are preferred.

On the other hand, the term "the concentrate of a green tea extract", said concentrate being added at this stage, means one obtained by concentrating an extract of tea leaves in water, a water-soluble organic solvent or a mixture thereof, and includes those prepared by processes exemplified in detail in JP-A-59-219384, JP-A-4-20589, JP-A-5-260907, JP-A-5-306279, JP-A-2003-304811 and JP-A-2003-219800, respectively. As commercial products, "POLYPHENON™" (product of Mitsui Norin Co., Ltd.), "TEAFURAN™" (product of ITO EN, LTD.) and "SUNPHENON™" (product of Taiyo Kagaku Co., Ltd.) can be mentioned. In addition, column-purified products and chemically synthesized products can also be used. As forms of a concentrate of a green tea extract as used herein, various forms can be mentioned such as a solid, aqueous solution and slurry.

As the packaged beverage according to the present invention, a packaged green tea beverage is preferred.

Similar to general beverages, a package useful for the packaged beverage according to the present invention can be used in an ordinary form such as a molded package made of polyethylene terephthalate as a principal component (so-called PET bottle), a metal can, a paper package combined with metal foils or plastic films, or a bottle. The term "packaged beverage" as used herein means a beverage which can be taken without dilution. A PET bottle is preferred from the viewpoint of enabling recapping upon taking the packaged beverage.

The packaged beverage according to the present invention can be produced, for example, by filling the beverage in a package such as a metal can and, when heat sterilization is feasible, conducting heat sterilization under sterilization conditions as prescribed in the Food Sanitation Act. For those which cannot be subjected to retort sterilization like PET bottles or paper packages, a process is adopted such that the beverage is sterilized beforehand under similar sterilization conditions as those described above, for example, at a high temperature for a short time by a plate-type heat exchanger, is cooled to a particular temperature, and is then filled in a package. Under aseptic conditions, additional ingredients may be added to and filled in a filled package. To adjust the ratio of the non-epicatechins to the epicatechins, heat treatment may be applied before these sterilization steps or a green tea extract to be added may be used after subjecting it to heat treatment.

A description will next be made about the second aspect of the present invention.

The terms "non-polymer catechins (A)" and "non-polymer catechingallates (B)" as used herein have the same meanings as defined above with respect to the first aspect of the present invention.

The packaged beverage according to the present invention contains the non-polymer catechins (A), each of which is a non-polymer and is in a form dissolved in water, at from 0.05 to 0.45 wt. %, preferably from 0.06 to 0.45 wt. %, more preferably from 0.07 to 0.45 wt. %, even more preferably from 0.8 to 0.36 wt. %, even more preferably from 0.09 to 0.3 wt. %, and even more preferably from 0.1 to 0.3 wt. %. A content of non-polymer catechins at lower than 0.05 wt. % makes it difficult to readily ingest a great deal of non-polymer catechins at once. A concentration higher than 0.45 wt. %, on the other hand, can hardly lessen the bitterness and astringency.

The concentration of non-polymer catechins (A) in the present invention is defined in terms of the total amount of eight types of catechins, that is, catechin, gallocatechin, catechingallate, gallocatechingallate, epicatechin, epigallocatechin, epicatechingallate and epigallocatechingallate. On the other hand, the concentration of non-polymer catechingallates (C) is defined in terms of the total amount of four types of catechingallates, that is, catechingallate, gallocatechingallate, epicatechingallate, and epigallocatechingallate.

The weight ratio [(A1/A2)] of the non-epicatechins (A1) to the epicatechins (A2) in the non-polymer catechins in the packaged beverage according to the present invention may be preferably from 0.54 to 9.0, more preferably from 0.55 to 9.0, even more preferably from 0.67 to 9.0, even more preferably from 0.73 to 9.0, and even more preferably from 1.0 to 9.0 from the standpoint of controlling a hue change during storage.

The weight ratio [(C)/(A)] of the non-polymer catechingallates (C), which consist of catechingallate, epicatechingallate, gallocatechingallate and epigallocatechingallate, to the non-polymer catechins (A) in the packaged beverage according to the present invention is from 0.7 to 1.0, preferably from 0.75 to 1.0, more preferably from 0.8 to 1.0, and even more preferably from 0.9 to 1.0 from the standpoint of the effectiveness of physiological effects of the non-polymer catechins.

In the packaged beverage according to the present invention, the weight ratio of epigallocatechin and gallocatechingallate to the non-polymer catechingallates (C) may preferably be from 0.7 to 0.9 in view of their high content ratio in tea leaves and the economical efficiency required for the concentrate of the green tea extract.

In the present invention, the term "cyclodextrin" means a cyclic oligosaccharide which can be obtained by causing an enzyme (cyclodextrin glucanotransferase) to act on a starch. It has a structure consisting of glucose molecules bonded together in a cyclic form. Depending on the number of glucose molecules bonded together, one consisting of six glucose molecules is called "α-cyclodextrin", one consisting of seven glucose molecules is called "β-cyclodextrin", and one consisting of eight glucose molecules is called "γ-cyclodextrin". For these differences in the number of glucose molecules bonded together, variations arise in cavity diameter, cavity depth and cavity volume when their molecular structures are viewed on the angstrom level. Among these cyclodextrins, β-cyclodextrin (D) is preferably used in the present invention with a view to making β-cyclodextrin play a central role to the effects although one or more of the remaining cyclodextrins may also be used in combination. Usable examples of β-cyclodextrin (D) include "CELDEX™ β-CD" (product of NIHON SHOKUHIN KAKO CO., LTD.) and "DEXPEARL™ β-100" (product of ENSUIKO Sugar Refining Co., Ltd.).

The content of β-cyclodextrin is preferably from 0.07 to 0.49 wt. %, more preferably from 0.08 to 0.3 wt. %, and even more preferably from 0.1 to 0.2 wt. % in the packaged beverage. With a system added with no β-cyclodextrin or with a system added with β-cyclodextrin in a content lower than 0.07 wt. %, the pigmentation of teeth with the non-polymer catechingallates increases. A content higher than 0.49 wt. %, on the other hand, impairs the effect of a flavor added to the beverage. Therefore, contents outside the above-described range are not preferred.

Preferably, the packaged beverage according to the present invention can be produced by adding a green tea extract in which the ratio [(C)/(A)] of the non-polymer catechingallates to the non-polymer catechins is from 0.7 to 1.0. As the green tea extract in which the ratio [(C)/(A)] of the non-polymer catechingallates to the non-polymer catechins is from 0.7 to 1.0, a concentrate of a green tea extract is preferred. It is preferred to produce the packaged beverage according to the present invention by adding, to the concentrate of the green tea extract, other ingredients, for example, a tea extract.

The term "the concentrate of a green tea extract", said concentrate being used in the packaged beverage according to the present invention, means one obtained by concentrating an extract of tea leaves in water, a water-soluble organic solvent or a mixture thereof, and includes those prepared by processes exemplified in detail in JP-A-59-219384, JP-A-4-20589, JP-A-5-260907, JP-A-5-306279, JP-A-2003-304811 and JP-A-2003-219800, respectively. As commercial products, "POLYPHENON™" (product of Mitsui Norin Co., Ltd.), "TEAFURAN™" (product of ITO EN, LTD.) and "SUNPHENON™" (product of Taiyo Kagaku Co., Ltd.) can be mentioned. In addition, column-purified products and chemically synthesized products can also be used. As forms of a concentrate of a green tea extract as used herein, various forms can be mentioned such as a solid, aqueous solution and slurry.

Examples of the green tea for use as a raw material for the concentrate of the green tea extract, said concentrate being useful in the packaged beverage according to the present invention, include tea leaves prepared from green tea leaves of the Genus *Camellia*, for example, *C. sinensis, C. assamica* and the Yabukita variety, or their hybrids. As the prepared tea leaves, so-called green tea leaves such as sencha (middle-grade green tea) are more preferred for the high content of residual non-polymer catechins.

As tea leaves for the tea extract for use in the packaged beverage according to the present invention, those prepared from green tea leaves of the Genus *Camellia*, for example, *C. sinensis, C. assamica* and the Yabukita variety, or their hybrids can be mentioned. As for processed tea leaves, non-fermented tea leaves, semi-fermented tea leaves and fermented tea leaves are all usable. The use of an extract of non-fermented tea leaves (green tea or the like) as a tea extract can provide a green tea beverage, the use of an extract of semi-fermented tea leaves as a tea extract can provide a semi-fermented tea beverage, and the use of an extract of fermented tea leaves as a tea extract can provide a fermented tea beverage.

Examples of tea leaves for the tea extract to be used in the packaged beverage according to the present invention include those prepared from green tea leaves obtained from the Genus *Camellia*, for example, *C. sinensis, C. assamica* and the Yabukita variety, or their hybrids.

It is preferred to add a bitterness suppressor to the packaged beverage according to the present invention, because it renders the packaged beverage more palatable. Preferred examples of the bitterness suppressor include water-soluble polymers. Illustrative of the water-soluble polymers are pectin and dextrin.

The pH of the packaged beverage according to the present invention is set at a range from 5 to 7 at 25° C. from the standpoint of the stability of the color tone of the beverage containing non-polymer catechingallates at high concentration.

To the packaged beverage according to the present invention, it is possible to add, in combination with the ingredients derived from tea, additives—such as antioxidants, flavors, various esters, organic acids, organic acid salts, inorganic acids, inorganic acid salts, inorganic salts, colorants, emulsifiers, preservatives, seasoning agents, pH regulators and quality stabilizers—either singly or in combination.

Examples of the inorganic acids and inorganic acid salts include phosphoric acid, disodium phosphate, sodium metaphosphate, and sodium polyphosphate. These inorganic acids and inorganic acid salts may be contained preferably at a concentration of from 0.01 to 0.5 wt. %, with from 0.01 to 0.3 wt. % being more preferred, in the beverage according to the present invention.

With similarity to general beverages, a package useful for the packaged beverage according to the present invention can be used in an ordinary form such as a molded package made of polyethylene terephthalate as a principal component (so-called PET bottle), a metal can, a paper package combined with metal foils or plastic films, or a bottle. The term "packaged beverage" as used herein means a beverage which can be taken without dilution.

The packaged beverage according to the present invention can be produced, for example, by filling the beverage in a package such as a metal can and, when heat sterilization is feasible, conducting heat sterilization under sterilization conditions as prescribed in the Food Sanitation Act. For those which cannot be subjected to retort sterilization like PET bottles or paper packages, a process is adopted such that the beverage is sterilized beforehand under similar sterilization conditions as those described above, for example, at a high temperature for a short period by a plate-type heat exchanger, is cooled to a particular temperature, and is then filled in a package. Under aseptic conditions, additional ingredients may be added to and filled in a filled package. To adjust the ratio of the non-epicatechins to the epicatechins, heat treatment may be applied before these sterilization steps or a green tea extract to be added may be used after subjecting it to heat treatment.

The following examples further describe and demonstrate embodiments of the present invention. The examples are given solely for the purpose of illustration and are not to be construed as limitations of the present invention.

EXAMPLES

Measurement of Catechins

A high-performance liquid chromatograph (model: SCL-10AVP) manufactured by Shimadzu Corporation was used. The chromatograph was fitted with an LC column packed with octadecyl-introduced silica gel, "L-Column, TM ODS" (4.6 mm in diameter×250 mm in length; product of Chemicals Evaluation and Research Institute, Japan). A beverage was filtered through a filter (0.8 μm), and by the high-performance liquid chromatograph, the filtrate was subjected to chromatography at a column temperature of 35° C. by gradient elution. A 0.1 mol/L solution of acetic acid in distilled water and a 0.1 mol/L solution of acetic acid in acetonitrile were used as mobile phase solution A and mobile phase solution B, respectively. The measurement was conducted at a sample injection quantity of 10 μL and a UV detector wavelength of 280 nm.

Examples 1–4 & Comparative Examples 1–4

"TEAFURAN™ 90S" (product of ITO EN, LTD.) was dissolved in aliquots of deionized water to give catechin concentrations of 0.20 wt. % and 0.40 wt. %, respectively. The pH of the resultant solutions was adjusted with ascorbic acid and sodium ascorbate to prepare beverages. The amount of each added is summarized in Table 1. Next, the beverages were each measured for L-value (brightness) and b-value (yellow) by a color difference meter ("Color Meter ZE2000", trade name; manufactured by Nippon Denshoku Industries Co., Ltd.). The results are shown in Table 1.

TABLE 1 pH vs. Hue

|  | Examples | | | | Comparative Examples | | | |
| --- | --- | --- | --- | --- | --- | --- | --- | --- |
|  | 1 | 2 | 3 | 4 | 1 | 2 | 3 | 4 |
| Concentration of catechins (A) [wt. %] | 0.20 | 0.20 | 0.40 | 0.40 | 0.20 | 0.20 | 0.40 | 0.40 |
| Gallates/catechins ratio (C)/(A) [—] | 1.0 | 1.0 | 1.0 | 1.0 | 1.0 | 1.0 | 1.0 | 1.0 |
| Ascorbic acid [wt. %] | 0.16 | 0.48 | 0.16 | 0.48 | 0.72 | 0.8 | 0.72 | 0.8 |
| Sodium ascorbate [wt. %] | 0.84 | 0.52 | 0.84 | 0.52 | 0.08 | 0 | 0.08 | 0 |
| pH | 6.38 | 4.78 | 6.32 | 5.13 | 4.34 | 3.57 | 4.32 | 3.57 |
| L-value [—] | 79.98 | 82.78 | 65.35 | 66.18 | 84.02 | 84.53 | 68.69 | 71.08 |
| b-value [—] | 21.06 | 22.25 | 66.18 | 27.19 | 23.59 | 25.53 | 30.24 | 33.59 |

As a result of the test, it has been found that in a green tea extract rich in non-polymer catechingallates and extremely high in purification degree, the pH-dependent color change becomes smaller as the pH approaches toward a neutral range. Described specifically, it has been ascertained that, when the long-term stability as a packaged beverage and the compositional changes through sterilization are taken into consideration, a pH range of from 4.5 to 7 is preferred to minimize the effect of pH variations on the external appearance of the beverage during storage or upon sterilization.

Ranking of Tooth Pigmentation

Measurement was repeated 5 times per sample, and the average of the measurement data was recorded. As a measuring instrument, a dental color reader (manufactured by Konica Minolta Sensing, Inc.) was used.

Examples 5–7 & Comparative Examples 5–8

Preparation of Beverages and Ranking of Pigmentation

"TEAFURAN™ 90S" (product of ITO EN, LTD.) was dissolved in aliquots of deionized water to give catechin concentrations of 0.15 wt. %, 0.30 wt. % and 0.60 wt. %, respectively. Then, the following beverages were prepared; ones with no cyclodextrin added thereto, ones with α-cyclodextrin added thereto to give a concentration of 0.075 wt. %, and ones with β-cyclodextrin added thereto to give concentrations of 0.0375, 0.075, 0.15 and 0.3 wt. %, respectively. The apatite samples ("APP-100", trade name; product of PENTAX Corporation), test model samples of teeth, were next immersed for 10 minutes in an artificial saliva [a mixed solution consisting of 0.1 M $CaCl_2$ (15 mL), 0.1 M $KH_2PO_4$ (49 mL) and 1.0 M HFPES (20 mL)], then they were immersed for 10 minutes in a 1% solution of albumin (produced from bovine serum, product of Wako Pure Chemical Industries, Ltd.) and then for 10 minutes in the beverages of the Examples and Comparative Examples, respectively. Finally, the apatite samples were briefly rinsed with deionized water, and were then dried in air for approximately half a day. Those pigmentation ranking tests were all performed at room temperature. The compositions of the beverages prepared as described above and the results of their pigmentation ranking tests are shown in Table 2 to Table 4.

A relationship between catechin concentrations and the pigmentation of teeth is shown in Table 2. It is understood from a*, an index of red color, that the pigmentation of teeth becomes severer as the concentration of catechins in a beverage increases. In the system with β-cyclodextrin (β-CD) added therein, on the other hand, pigmentation was evidently supressed.

TABLE 2

Effect of Catechin Concentration on Color

|  |  | Ex. 5 | Comp. Ex. 5 | Comp. Ex. 6 |
| --- | --- | --- | --- | --- |
| Concentration of catechins (A) | wt. % | 0.3 | 0.3 | 0.6 |
| Gallates/catechins ratio (C)/(A) | — | 1.0 | 1.0 | 1.0 |
| Concentration of β-CD | wt. % | 0.15 | 0 | 0.3 |
| a* | — | 1.102 | 1.508 | 1.438 |

Table 3 shows differences in effect depending on the kind of cyclodextrin. It has been found that even at the same catechin concentration and the same cyclodextrin concentration, the degree of pigmentation of teeth which are exposed to the beverage while it is taken differs substantially depending on the kind of cyclodextrin, and β-cyclodextrin is shown to be more effective than α-cyclodextrin.

TABLE 3

Effect of Cyclodextrins

|  |  | Ex. 6 β-CD[1] | Comp. Ex. 7 α-CD[2] (70%-purity product) |
| --- | --- | --- | --- |
| Concentration of catechins (A) | wt. % | 0.15 | 0.15 |
| Gallates/catechins ratio (C)/(A) | — | 1.0 | 1.0 |
| Concentration of CD | Wt. % | 0.075 | 0.075 |
| a* | — | 0.86 | 0.95 |

[1]"CELDEX ™ β-CD" (product of NIHON SHOKUHIN KAKO CO., LTD.)
[2]"DEXPEARL ™ α-CD" (product of ENSUIKO Sugar Refining Co., Ltd.)

Table 4 shows the results of a study on the added amount of β-cyclodextrin. It has been found that, although β-cyclodextrin controls the pigmentation of teeth, the addition in an amount less than 0.075 wt. % leads to a marked increase in the pigmentation and therefore, that β-cyclodextrin needs to be added in an amount of 0.075 wt. % or more.

TABLE 4

Optimization of β-CD Concentration

|  |  | Ex. 7 | Comp. Ex. 8 |
| --- | --- | --- | --- |
| Concentration of catechins[1] (A) | wt. % | 0.15 | 0.15 |
| Gallates/catechins ratio (C)/(A) | — | 1.0 | 1.0 |
| Concentration of β-CD | wt. % | 0.15 | 0.0375 |
| a* | — | 0.86 | 1.198 |

[1]"TEAFURAN ™": (B)/(A) = 1.0
: (epigallocatechingallate + gallocatechingallate)/(epigallocatechingallate + gallocatechingallate + epicatechingallate + catechingallate) = 0.8
: catechin purity 70 wt. %

Example 8 & Example 9

A packaged oolong tea beverage and packaged green tea beverage were each produced by filling the corresponding ingredients of Table 5 in a 500-mL can, and subsequent to an adjustment to pH 6, conducting sterilization at 120° C. for 15 minutes.

TABLE 5

Formulation Table

|  |  | Example 8 Oolong tea | Example 9 Green tea |
|---|---|---|---|
| "TEAFURAN™ 90S" | wt. % | 0.15 | 0.09 |
| Oolong tea extract[1] | wt. % | 22 | — |
| Green tea extract[2] | wt. % | — | 17 |
| β-CD | wt. % | 0.3 | 0.3 |
| Sodium hydrogencarbonate | wt. % | q.s. | q.s. |
| Deionized water | wt. % | Balance | Balance |
| Total | wt. % | 100 | 100 |

[1] Prepared by adding oolong tea leaves (50 g) to deionized water (85° C., 1,500 g), extracting the tea leaves for 8 minutes and then filtering off the tea leaves through a flannel filter cloth.
[2] Prepared by adding green tea leaves (50 g) to deionized water (65° C., 1,500 g), extracting the tea leaves for 5 minutes and then filtering off the tea leaves through a flannel filter cloth. The concentration of non-polymer catechins in the green tea extract was 0.22 wt. %.

TABLE 6

Compositions of packaged beverages after sterilization

|  |  | Ex. 8 Oolong tea | Ex. 9 Green tea |
|---|---|---|---|
| Concentration of non-polymer catechins (A) | wt. % | 0.1 | 0.1 |
| (EGCg + GCg)/(EGCg + GCg + ECg + Cg) |  | 0.8 | 0.8 |
| PH |  | 6 | 6 |
| (C)/(A) |  | 1.0 | 0.8 |
| (A1)/(A2) |  | 1.1 | 1.2 |
| Pigmentation of teeth |  | No problem | No problem |

The neutral beverages of Examples 8 and 9, whose analytical data is show in Table 6, caused less pigmentation of teeth when they were taken, despite a concentrate of a green tea extract, said concentrate having had a strong red color, had been added to them.

What is claimed is:

1. A packaged beverage comprising the following ingredients (A), (B) and (C):
   (A) from 0.07 to 0.45 wt. % of non-polymer catechins,
   (B) from 0.15 to 0.5 wt. % of ascorbic acid, and
   (C) non-polymer catechingallates,
   wherein a content weight ratio (C/A) of said non-polymer catechingallates (C) to said non-polymer catechins (A) is from 0.8 to 1.0, and said packaged beverage has a pH of from 4.5 to 7.

2. The packaged beverage according to claim 1, wherein a package is a clear PET bottle.

3. The packaged beverage of claim 1, wherein said non-polymer catechins is at least one selected from the group consisting of catechin, gallocatechin, catechingallate, gallocatechingallate, epicatechin, epigallocatechin, epicatechingallate, epigallocatechingallate and a mixture thereof.

4. The packaged beverage of claim 1, wherein said non-polymer catechingallates is at least one selected from the group consisting of catechingallate, gallocatechingallate, epicatechingallate, epigallocatechingallate and a mixture thereof.

5. The packaged beverage of claim 1, wherein said non-polymer catechins is present in an amount of from 0.08 to 0.45 wt. %.

6. The packaged beverage of claim 1, wherein said non-polymer catechins is present in an amount of from 0.09 to 0.45 wt. %.

* * * * *

UNITED STATES PATENT AND TRADEMARK OFFICE
CERTIFICATE OF CORRECTION

PATENT NO. : 7,220,444 B2  Page 1 of 1
APPLICATION NO. : 10/948163
DATED : May 22, 2007
INVENTOR(S) : Ogura et al.

It is certified that error appears in the above-identified patent and that said Letters Patent is hereby corrected as shown below:

On the title page, Item (45) and the Notice information are incorrect. Item (45) and the Notice information should read as follows:

-- (45) Date of Patent: May 22, 2007

(*) Notice: Subject to any disclaimer, the term of this patent is extended or adjusted under 35 U.S.C. 154(b) by 0 days. --

Signed and Sealed this

Seventh Day of August, 2007

JON W. DUDAS
*Director of the United States Patent and Trademark Office*